(No Model.)
A. B. CALKINS.
PARALLEL RULING SCALE.
No. 458,966. Patented Sept. 1, 1891.
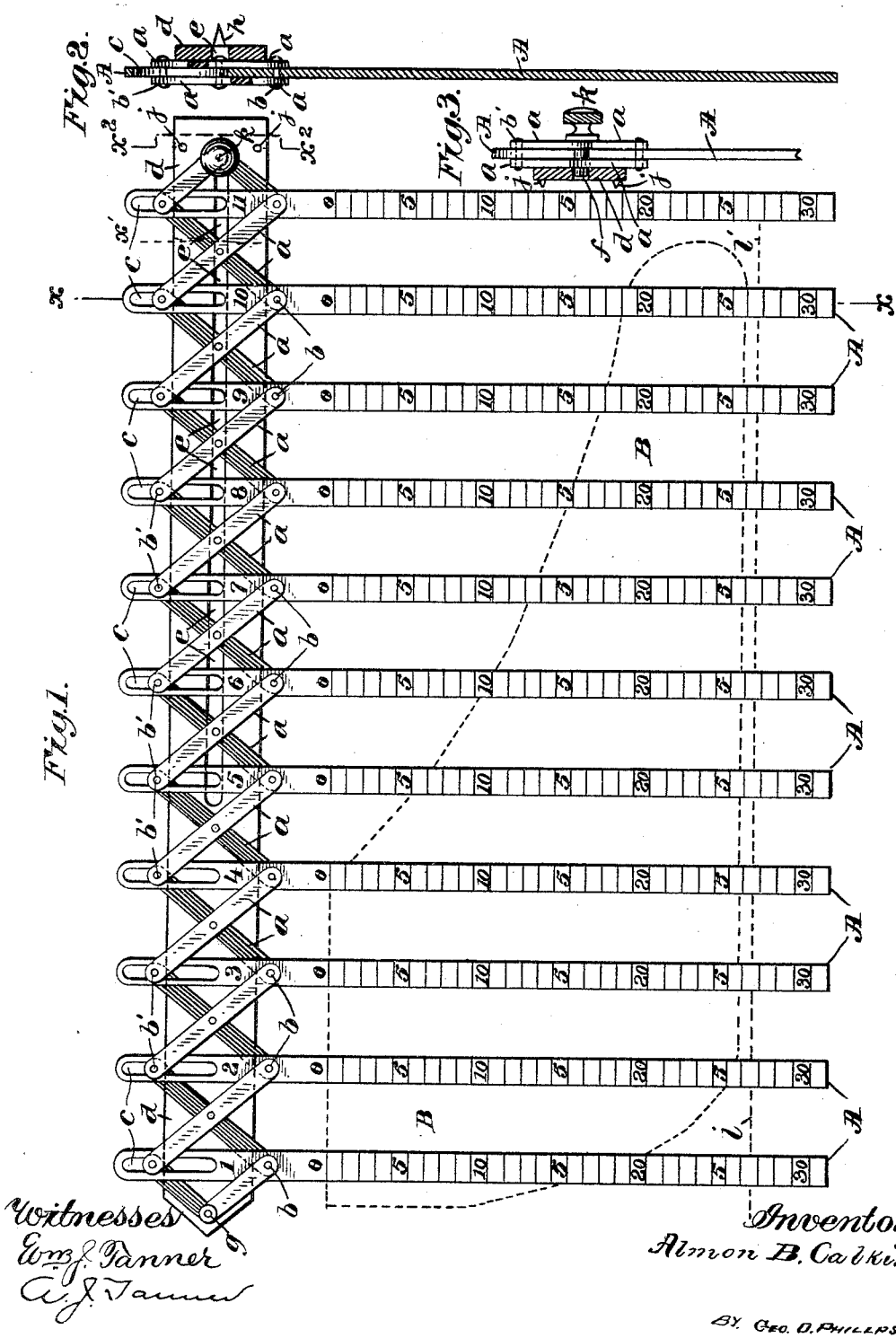

UNITED STATES PATENT OFFICE.

ALMON B. CALKINS, OF NEW YORK, N. Y., ASSIGNOR OF ONE-HALF TO FERRAL C. DININNY, JR., OF SAME PLACE.

PARALLEL-RULING SCALE.

SPECIFICATION forming part of Letters Patent No. 458,966, dated September 1, 1891.

Application filed August 7, 1890. Serial No. 361,316. (No model.)

*To all whom it may concern:*

Be it known that I, ALMON B. CALKINS, a citizen of the United States, residing at New York, in the county of New York and State of New York, have invented certain new and useful Improvements in Parallel - Ruling Scales; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a device for dividing any regular or irregular figure or diagram into equal parts, and is more particularly designed for use in locating and erecting the ordinates of a steam - engine - indicator diagram.

My invention consists of a series of graduated parallel rulers linked together at one of their ends and arranged by means of such link connection, combined with a longitudinal slot in such ends to be moved parallel to and from each other, so that any desired number of parallel lines or ordinates may be drawn through a diagram within the capacity or travel of such rules. I also preserve the horizontal alignment of all the rules by confining one end of the scale to a fixed pivot and a slot or other suitable guide on a line with such pivot and at right angles to the graduated rules, and a pin or other suitable device connected to the free end of such rules to engage with such slot and travel therein, all of which improvements will be more fully described in the specification, and particularly pointed out in the claim.

To more fully understand my invention, reference is had to the accompanying drawings, which form a part of this specification.

Figure 1 represents a plan view of the scale, showing the same extended. Fig. 2 represents a sectional end elevation of one of the rules and slotted alignment-plate through X and links through X' of Fig. 1. Fig. 3 represents a broken end elevation of the rules and a section of the alignment-plate through $X^2$ of Fig. 1.

Its construction and operation are as follows:

A are the parallel rules, numbered, respectively, 1, 2, 3, 4, 5, 6, 7, 8, 9, 10, and 11; $a$, connecting-links; $b$, pin connecting the lower end of such links together and to the rules; $b'$, pins connecting the upper end of the links together; $c$, slot in the upper end of each of the rules to engage pins $b'$; $d$, alignment-plate; $e$, longitudinal slot therein to admit pin $f$ of the link connection; $g$ pin on which the two first links are pivoted, said pin extending through the plate $d$, and having the point $h$ (see also Fig. 2) projecting therefrom.

In Fig. 1 is shown the application of the scale in dividing the indicator-diagram into equal parts. The scale is placed upon the diagram B, the alignment-strip $d$ being placed parallel with the atmospheric line $i$ of such diagram, and kept in such position by means of the point $h$ of pin $g$ and the pointed pins $j\, j$, which pins protrude through such strip. Then by means of the thumb-pin $k$, whose body not only connects the last links, but its projecting end enters slot $e$ of strip $d$, the scale is extended over the diagram B, dividing the same into any number of equal parts required. The ordinates are erected on such diagram by means of a pencil drawn along the right-hand edge of each of the rules which cover the diagram, it being customary in such cases to leave one-half of an ordinate at each end of the diagram. To insure a close contact of such rules with the diagram and prevent errors in drawing the ordinates, only the upper ends of the rules are jointed. The slightest variation or difference in the distance between the holes in the links $a$, which are pivoted to the pins or rivets $b\, b'$, would affect the parallelism of the several rules, and especially so when they are linked only at one end. To compensate for such inaccuracy, the slots $c$ are provided in the ends of the several rules, which slots admit the pins $b'$ of the upper link-joint. As the rules are closed or opened, such pins move up and down, the several slots thus avoiding any disposition of the links to cramp and destroy the parallelism of the rules. The several rules are graduated into such fractional parts as may be desired, and by means of such graduations the height of the several ordinates may be taken after they have been drawn, as before mentioned. To accurately determine the height of such ordinates, it is absolutely necessary that the graduation on the several rules should be in alignment. This is accomplished by means of the body *f* of the thumb-pin *k* engaging with the slot *e* of the strip *d*. This slot, as before mentioned, being parallel with the atmospheric line *i*, from which the heights of the several ordinates are reckoned, it is evident that the graduations on the several rules will also be parallel therewith and with each other. As the slot *e* acts in the capacity of a guide to preserve the alignment of the several rules and keep their graduations parallel with the atmospheric line, I would consider any means that would accomplish this result in substantially the same manner an equivalent of such slot.

Having thus described my invention, what I claim as new, and wish to secure by Letters Patent, is—

In a parallel-ruling scale, the combination of a series of graduated rules linked together and arranged parallel with each other, a longitudinal slot in each of such rules, and a jointing-pin of the link connection engaging such slot with a horizontal alignment-guide placed parallel with the plane of movement of such rules, a movable part of such scale engaging with such guide to preserve the horizontal alignment of all the moving parts, all substantially as shown and described.

In testimony whereof I affix my signature in presence of two witnesses.

ALMON B. CALKINS.

Witnesses:
WILLIAM MOLLOY,
CHAS. A. RILEY.